United States Patent
Hagan et al.

(10) Patent No.: US 9,843,810 B2
(45) Date of Patent: Dec. 12, 2017

(54) METHOD OF USING LASER SCANNED POINT CLOUDS TO CREATE SELECTIVE COMPRESSION MASKS

(75) Inventors: James E. Hagan, Grantham, NH (US); Arkadiusz Wysocki, Lodz (PL); Marcin Michal Kmiecik, Lodz (PL)

(73) Assignee: TOMTOM GLOBAL CONTENT B.V., Amsterdam (NL)

( * ) Notice: Subject to any disclaimer, the term of this patent is extended or adjusted under 35 U.S.C. 154(b) by 569 days.

(21) Appl. No.: 12/735,630

(22) PCT Filed: Apr. 18, 2008

(86) PCT No.: PCT/NL2008/050227
§ 371 (c)(1),
(2), (4) Date: Oct. 7, 2010

(87) PCT Pub. No.: WO2009/128701
PCT Pub. Date: Oct. 22, 2009

(65) Prior Publication Data
US 2011/0026772 A1    Feb. 3, 2011

(51) Int. Cl.
| | |
|---|---|
| H04N 9/47 | (2006.01) |
| H04N 19/17 | (2014.01) |
| H04N 19/124 | (2014.01) |
| H04N 19/136 | (2014.01) |

(52) U.S. Cl.
CPC ........... *H04N 19/17* (2014.11); *H04N 19/124* (2014.11); *H04N 19/136* (2014.11)

(58) Field of Classification Search
None
See application file for complete search history.

(56) References Cited

U.S. PATENT DOCUMENTS

| | | | |
|---|---|---|---|
| 4,951,140 A | 8/1990 | Ueno et al. | |
| 6,285,458 B1* | 9/2001 | Yada | 358/1.15 |
| 7,233,691 B2* | 6/2007 | Setterholm | 382/154 |
| 2004/0066391 A1 | 4/2004 | Daily et al. | |

(Continued)

FOREIGN PATENT DOCUMENTS

| | | |
|---|---|---|
| CN | 1797398 A | 7/2006 |
| EP | 1480196 | 11/2004 |

(Continued)

OTHER PUBLICATIONS

Iddan G J et al: "3D Imaging in the Studio (and Elsewhere . . . )" Proceedings of the SPIE, SPIE, Bellingham, VA, US, vol. 4298, Jan. 24, 2001 (Jan. 24, 2001), pp. 48-55, XP008005351 ISSN: 0277-786X.*

(Continued)

*Primary Examiner* — James M Anderson, II

(57) ABSTRACT

A method of processing camera data of a mobile mapping system is disclosed. In at least one embodiment, the method includes a) obtaining camera data from at least one camera of the mobile mapping system, b) detecting at least one region in the camera data, c) applying a compression technique on the camera data in a first region, and d) obtaining range sensor data from at least a first range sensor. The range sensor data may at least partially correspond to the camera data. Also, in at least one embodiment, b) includes using the range sensor data to identify the at least one region in the camera data.

17 Claims, 7 Drawing Sheets

(56) References Cited

U.S. PATENT DOCUMENTS

| | | | |
|---|---|---|---|
| 2004/0234140 A1 | 11/2004 | Nonaka | |
| 2006/0017835 A1* | 1/2006 | Jacobsen | H04N 19/17 348/345 |
| 2009/0052737 A1* | 2/2009 | Lycett | 382/103 |

FOREIGN PATENT DOCUMENTS

| | | |
|---|---|---|
| JP | 3230691 A | 10/1991 |
| JP | 11150726 A | 6/1999 |
| JP | 2003259354 A | 9/2003 |
| JP | 2003302470 A | 10/2003 |
| JP | 2006072495 A | 3/2006 |
| WO | WO 2008/054203 | 5/2008 |
| WO | WO 2008068707 A2 * | 6/2008 |
| WO | WO 2009/061174 | 5/2009 |

OTHER PUBLICATIONS

Henri Nicolas et al: "Minimum Description Length Criterion and Segmentation Map Coding for Region-Based Video Compression" IEEE Transactions on Circuits and Systems for Video Technology, IEEE Service Center, Piscataway, NJ, US, vol. 11, No. 2, Feb. 1, 2001 (Feb. 1, 2001), XP011014164 ISSN: 1051-8215.*

Trew et al: "Automatic Face Location to Enhance Videophone Picture Quality" Proceedings of the British Machine Vision Conference (BMVC '92), Leeds, GB, Sep. 22-24, 1992, Sep. 22, 1992 (Sep. 22, 1992), pp. 488-497, XP000519204 Berlin, DE.*

Henri Nicolas et al: "Minimum Description Length Criterion and Segmentation Map Coding for Region-Based Video Compression" IEEE Transactions on Circuits and Systems for Video Technology, IEEE Service Center, Piscataway, NJ, US,vol. 11, No. 2, Feb. 1, 2001 (Feb. 1, 2001), XP011014164 ISSN: 1051-8215.*

Perrollaz et al: "Long Range Obstacle Detection Using Laser Scanner and Stereovision", Intelligent Vehicles Symposium 2006, Jun. 13-15, 2006, Tokyo, Japan, pp. 182-187.*

Yang et al., "Reduction of color space dimensionality by moment-preserving thresholding and its application for edge detection in color images", May 1, 1996, Pattern Recognition Letters 17, pp. 481-490.*

Martin et al., "Data and Model Driven Attention Mechanism for Autonomous Visual Landmark Acquisition", Apr. 2005, IEEE International Conference on Robotics and Automation, pp. 3372-3377.*

Piccioli et al. "Robust Road Sign Detection and Recognition from Image Sequences", Oct. 24-26, 1994, IEEE, Proceedings of the Intelligent Vehicles '94 Symposium. pp. 278-283.*

Broggi, Alberto et al. "Real Time Road Signs Recognition", Jun. 13-15, 2007, Proceedings of the IEEE Intelligent Vehicles Symposium, pp. 981-986.*

Perrollaz M et al: "Long range obstacle detection using laser scanner and stereovision" Proceedings of IV2006. IEEE Intelligent Vehicles Symposium IEEE Piscataway, NJ, USA, Jun. 2006 (Jun. 2006), p. 6 pp. , XP002461582.

Trassoudaine L et al: "Smart sensing and multi sensorial data fusion for road obstacle detection and tracking" Traitement Du Signal Gretsi France, vol. 13, No. 2, 1996, pp. 127-142, XP008080631.

Tsai-Hong Hong et al: "Fusing Ladar and Color Image Information for Mobile Robot Feature Detection and Tracking" 7th International Conference on Intelligent Autonomous Systems, [Online] 2002, XP002440706 Retrieved from the Internet: URL:http://cs-www.cs.yale.edu/homes/rasmussen/lib/papers/ias2002.pdf> [retrieved on Jul. 2, 2007].

Albus J et al: "4D/RCS sensory processing and world modeling on the demo III experimental unmanned ground vehicles" Proceedings of the 2002 IEEE International Symposium on Intelligent Control. (ISIC'02). Vancouver, Canada, Oct. 27-30, 2002, IEEE International Symposium on Intelligent Control, New York, NY : IEEE, US, Oct. 27, 2002 (Oct. 27, 2002), pp. 885-890, XP010623098.

Rongxing Li: "Mobile mapping: An emerging technology for spatial data acquisition" Photogrammetric Engineering and Remote Sensing, [Online] 1997, XP002461583 Retrieved from the Internet: URL:http://shoreline.eng.ohio-state.edu/ron/teaching/787/paper1.pdf> [retrieved on Jul. 2, 2007].

International Search Report dated Apr. 1, 2008 for International Application No. PCT/NL2007/050520.

International Preliminary Report on Patentability dated Oct. 19, 2010.

Trew, T.I.P., et al., "Automatic Face Location to Enhance Videophone Picture Quality," Proceedings of the British Machine Vision Conference (BMCV '92), Leeds, GB, 22-24, pp. 488-497, Sep. 22, 1992.

Iddan, G.J. et al., "3D Imaging in the Studio (and Elsewhere . . . )," Prceedings of the SPIE, vol. 4298, pp. 48-55, Jan. 24, 2001.

Nicolas, H. et al., "Minimum Description Length Criterion and Segmentation Map Coding for Region-Based Video Compression," IEEE, vol. 11, No. 2, pp. 184-198, Feb. 1, 2001.

Broggi, A. et al., "Real Time Road Signs Recognition," Intelligen Vehicles Symposium, pp. 981-986, Jun. 13, 2007.

Tao, V.C. et al., "Automated Processing of Mobile Mapping Image Sequences," ISPRS Journal of Photogrammetry and Remote Sensing, vol. 55, No. 5-6, pp. 330-346.

International Search Report.

* cited by examiner

METHOD OF USING LASER SCANNED POINT CLOUDS TO CREATE SELECTIVE COMPRESSION MASKS

FIELD OF THE INVENTION

The present invention relates to a method of processing camera data from a mobile mapping system (MMS), a computer arrangement, a data processing system comprising such a computer arrangement, a computer program product and a data carrier provided with such a computer program product.

BACKGROUND OF THE INVENTION

In some MMS applications, the primary intention is to capture pictures of building facades and other fixed objects, like trees, street signs and street lamps that are later used in "real-world" 2D and/or 3D images of streets used in e.g. car navigation systems. Then, these images are shown to drivers of a car provided with such a navigation system such that the driver sees 2D and/or 3D images on a screen of the navigation system corresponding with the real world view when looking through the windows of the car. Such pictures may also be used in other applications than car navigation systems, for instance, in games that can be played on computers either as a stand alone system or as cooperating in a networked environment. Such an environment may be the Internet. The solution of the present invention as presented below is not restricted to a specific application.

The pictures are collected and stored and involve an enormous data size, as many pictures are taken to cover a substantial part of a road network. The picture data thus comprises many frames of imagery, possibly from multiple cameras. In order to reduce the picture data to manageable size, compression techniques may be applied. Generally image quality is inversely related to the amount of compression. This may be disadvantageous when items such as traffic signs need to remain recognizable/legible despite possible compression techniques being applied to the picture data According to the prior art, the technique of identifying different regions of interest in each picture and using a first compression factor (relatively high) in a first region of interest and using a second compression factor (relatively low) in a second region of interest is known. This ensures that relatively high data size reduction is achieved, while not discarding valuable information, such as traffic signs. This technique is referred to as differential compression of raster images (i.e. camera data) and is a major component of modern document scanning and compression systems.

Most of these prior art solutions (i.e., Luratech's LuraDocument) use text recognition as a means of identifying regions of interest. The underlying assumption of such systems is that non-textual areas can be compressed at a higher rate (i.e., with more loss). Such algorithms are computationally expensive and complex, and if applied to the MMS data would need significant investment in computer power. Also, text recognition algorithms may require assumptions about font, spacing, rotation of the text to recognize. Most important, such techniques are limited to identifying regions of interest comprising text.

Document PCT/NL2006/050269, which was filed Oct. 30, 2006 and not published at the time of filing of this patent application, describes a system for supporting image recognition by finding regions in the image using a scanner, to identify certain objects. PCT/NL2006/050269 only refers to finding regions, but does not address the problem of managing the amount of camera data.

Document PCT/NL2007/050541, which was filed Nov. 7, 2007 and not published at the time of filing of this patent application, describes how scanner data may be used to identify certain objects, for instance to remove privacy sensitive data from the camera data. Again, this document does not address the problem of managing the amount of camera data.

SUMMARY OF THE INVENTION

It is an object of the present invention to provide a differential compression algorithm that can be performed using relatively little computer power.

According to an aspect, there is provided a method of processing camera data of a mobile mapping system, where the method comprises:
a) obtaining camera data from at least one camera of the mobile mapping system,
b) detecting at least one region in the camera data,
c) applying a compression technique on the camera data in a first region,
wherein the method further comprises obtaining range sensor data from at least a first range sensor, the range sensor data at least partially corresponding to the camera data and
b) comprises using the range sensor data to identify the at least one region in the camera data.

According to a further aspect there is provided a computer arrangement comprising a processor and memory connected to the processor, the memory comprising a computer program comprising data and instructions arranged to allow said processor to:
a) obtain camera data from at least one camera of the mobile mapping system,
b) detect at least one region in the camera data,
c) apply a first compression technique on the camera data in a first region,
wherein the processor is further allowed to obtain range sensor data from at least a first range sensor, the range sensor data at least partially corresponding to the camera data and
b) comprises using the range sensor data to identify the at least one region in the camera data.

According to an aspect there is provided a data processing system comprising a computer arrangement as described and a mobile system, said mobile system comprising a position determination system for providing said time and position and orientation data, at least a first range sensor for providing said first range sensor data and at least one camera for providing said image data.

According to an aspect there is provided a computer program product comprising data and instructions that can be loaded by a computer arrangement, allowing said computer arrangement to perform any of the described methods.

According to an aspect there is provided a data carrier provided with such a computer program.

It is noted that the provided embodiments are less computationally expensive and complex than text-based prior art solutions. As in the embodiments now use a range sensor, no assumptions about font, spacing, rotation of the text to recognize are required for recognizing traffic signs (planar objects). Furthermore, the embodiments are not limited to recognizing text, but can recognize many more objects.

BRIEF DESCRIPTION OF THE DRAWINGS

The invention will be explained in detail with reference to some drawings that are only intended to show embodiments of the invention but not to limit the scope. The scope of the invention is defined in the annexed claims and by its technical equivalents.

The drawings show.

DETAILED DESCRIPTION OF EMBODIMENTS

The present invention mainly relates to the field of processing images taken by cameras on a Mobile Mapping System (MMS). More specifically, in some embodiments, the invention relates to processing such images. However, other applications covered by the scope of the appended claims are not excluded. For instance, the camera(s) may be carried by any other suitable vehicle such as an aircraft or seagoing vessel.

Figure 1:
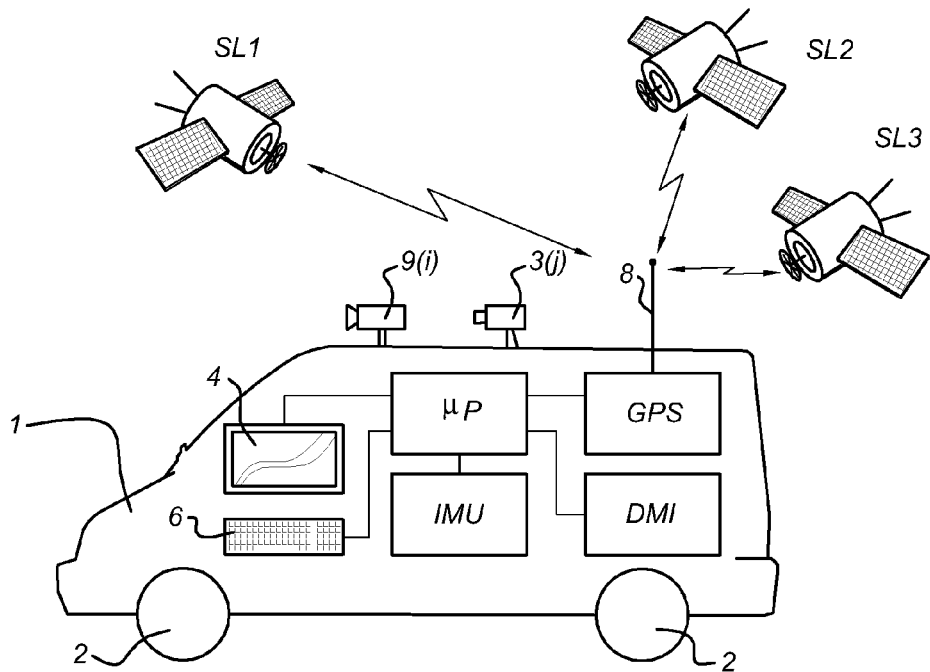
FIG. 1 shows a MMS system with a camera and a laser scanner.

FIG. 1 shows a MMS system that takes the form of a car 1. The car 1 is provided with one or more cameras 9(I), I=1, 2, 3, ... I, and one or more laser scanners 3(j), j=1, 2, 3, ... J.

In this text, the data captured by the camera(s) 9(i) will be referred to as camera data. This is 2D data. The data captured by the scanner(s) 3(j) will be referred to as scanner data. This is 3D data. The camera data and the scanner data together may be referred to as MMS data.

Range Sensor

Information from at least two or more laser scanners 3(j) may be used. The car 1 can be driven by a driver along roads of interest. The laser scanners 3(j) can be substituted by any kind of range sensor that allows, for some set of bearings, a detection of a distance between the range sensor and an object sensed by the range sensor. Such an alternative range sensor can, for instance be a radar sensor or a Lidar sensor. If a radar sensor is used its range and bearing measurement data should be comparable to those as can be obtained with a laser scanner.

The range sensor provides such points clouds relating to different objects. As objects are not located on the same location, points relating to each of such points clouds show a clear different distance and/or bearing to the range sensor depending on to what object they belong. So, using these differences in range relative to the range sensor, masks relating to different objects can be made with ease. Then these masks can be applied to the image as taken by the camera to identify objects in the image. This turns out to be a reliable way of identifying those objects and is easier than relying on image data only.

The laser scanner data may comprise a number of pixels, where each pixel comprises direction information, i.e. the direction the laser scanner was directed when obtaining the particular pixel, and distance information, i.e. the distance between the laser scanner and the detected object.

In an embodiment, the range sensor(s)/laser scanner(s) 3(j) is/are arranged to produce an output with minimal 50 Hz and 1 deg resolution in order to produce a dense enough output for the embodiments described here. A laser scanner such as MODEL LMS291-505 produced by SICK is capable of producing such output. Such a laser scanner provides enough resolution to detect items like traffic signs and the like.

Image Sensor

The term "camera" is understood here to include any type of image sensor, including for instance a Ladybug™.

The camera on the MMS system may take consecutive pictures in time such that it renders several pictures with overlapping portions of the same scene. In such overlapping portions a captured object may be visible in several pictures.

The principles of the invention can be applied while using any type of range sensors, for instance, laser, RADAR or LIDAR. The images can be taken by any type of camera carried by any suitable vehicle (for example, an aircraft).

The car 1 is provided with a plurality of wheels 2. Moreover, the car 1 is provided with a high accuracy position/orientation determination system. Such a system is arranged to provide 6 degrees of freedom data as to position and orientation of the car 1. An embodiment is shown in FIG. 1. As shown in FIG. 1, the position/orientation determination system comprises the following devices:

- a GPS (global positioning system) unit connected to an antenna 8 and arranged to communicate with a plurality of satellites SLk (k=1, 2, 3, ... ) and to calculate a position signal from signals received from the satellites SLk. The GPS unit is connected to a microprocessor μP. The microprocessor μP is arranged to store the data received from the GPS unit as a function of time. Such data will be sent to an external computer arrangement for further processing. In an embodiment, based on the signals received from the GPS unit, the microprocessor μP may determine suitable display signals to be displayed on a monitor 4 in the car 1, informing the driver where the car is located and possibly in what direction it is traveling (Note: GPS is used generically. Systems such as the European Galileo or Russian GLONASS may comprise a "GPS") as well as the original U.S. Department of Defense GPS.
- a DMI (Distance Measurement Instrument). This instrument is an odometer that measures a distance traveled by the car 1 by sensing the number of rotations of one or more of the wheels 2. The DMI is also connected to the microprocessor μP. The microprocessor μP is arranged to store the data received from the DMI as a function of time. Such data will also be sent to the external computer arrangement for further processing. In an embodiment, the microprocessor μP takes the distance as measured by the DMI into account while calculating the display signal from the output signal from the GPS unit.
- an IMU (Inertial Measurement Unit). Such an IMU can be implemented as three gyro units arranged to measure rotational accelerations and three translational accelerators along three orthogonal directions. The IMU is also connected to the microprocessor μP. The microprocessor μP is arranged to store the data received from the IMU as a function of time. Such data will also be sent to the external computer arrangement for further processing.

The system as shown in FIG. 1 collects geographic data, for instance by taking pictures with one or more camera(s) 9(i) mounted on the car 1. The camera(s) are connected to the microprocessor µP. Moreover, the laser scanners 3(j) take laser samples while the car 1 is driving along roads of interest. The laser samples, thus, comprise data relating to the environment associated with these roads of interest, and may include data relating to building blocks, to trees, traffic signs, parked cars, people, etc.

The laser scanners 3(j) are also connected to the microprocessor µP and send these laser samples to the microprocessor µP.

It is a general desire to provide as accurate as possible location and orientation measurements from the three measurement units: GPS, IMU and DMI. These location and orientation data are measured while the camera(s) 9(i) take(s) pictures and the laser scanner(s) 3(j) take(s) laser samples. Both the pictures (camera data) and the laser samples (scanner data) are stored for later use in a suitable memory of the microprocessor µP in association with corresponding location and orientation data of the car 1 at the time these pictures and laser samples were taken. An alternative way of correlating all data from the GPS, IMU, DMI, camera(s) 9(i) and laser scanners 3(j) in time is to time stamp all these data and store the time stamp data in conjunction with the other data in the microprocessor's memory. Other time synchronization markers can be used instead.

The pictures and laser samples (camera data and scanner data respectively) include information, for instance, as to building block façades, traffic signs.

Figure 2:
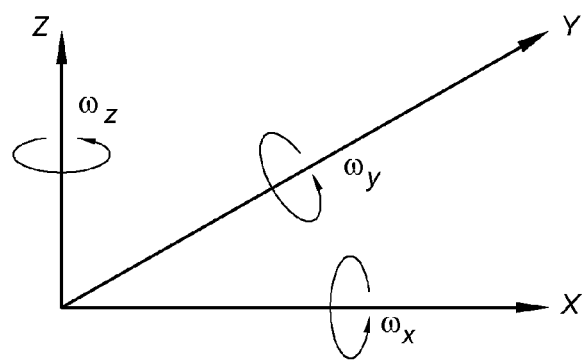
FIG. 2 shows a diagram of location and orientation parameters.

FIG. 2 shows which position signals can be obtained from the three measurement units GPS, DMI and IMU shown in FIG. 1. FIG. 2 shows that the microprocessor µP is arranged to calculate 6 different parameters, i.e., 3 distance parameters x, y, z relative to an origin in a predetermined coordinate system and 3 angle parameters $\omega_x$, $\omega_y$, and $\omega_z$, respectively, which denote a rotation about the x-axis, y-axis and z-axis respectively. The z-direction coincides with the direction of the gravity vector.

Figure 3:
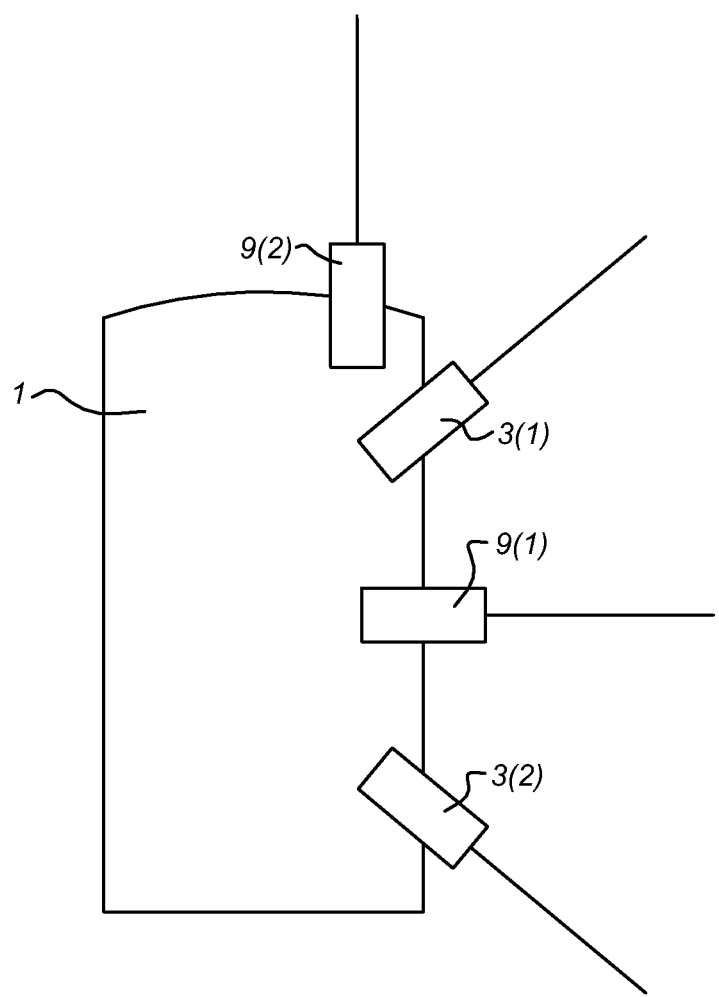
FIG. 3 shows a schematic top view of a car provided with two cameras and two range sensors on its roof.

FIG. 3 shows the MMS with two range sensors 3(1), 3(2) (that may be laser scanners but, alternatively, may for instance be radars), and two cameras 9(1), 9(2). The two range sensors 3(1), 3(2) are arranged on the roof of the car 1 such that they are directed towards a right side of the car 1 as viewed relative to a driving direction of the car 1. The scanning direction of range sensor 3(1) is indicated with SD1 whereas the scanning direction of range sensor 3(2) is indicated with SD2. The camera 9(1) is viewing to the right side too, i.e., it may be directed perpendicular to the driving direction of car 1. The camera 9(2) is viewing in the driving direction. This setup is suitable for all those countries where vehicles drive in right lanes. The setup is preferably changed for those countries where vehicles drive on the left side of the street in the sense that the camera 9(1) and the laser scanners 3(1), 3(2) are located on the left side of the car's roof (again "left" being defined relative to the driving direction of car 1). It should be understood that many other configurations could be used by one skilled in the art. For instance, one range sensor 3(1) could be located on the right side of the car 1, while the second range sensor 3(2) is located on the left side of the car 1. Of course, also a single laser scanner may be provided.

The microprocessor in the car 1 may be implemented as a computer arrangement. An example of such a computer arrangement is shown in FIG. 4a.

Figure 4A:
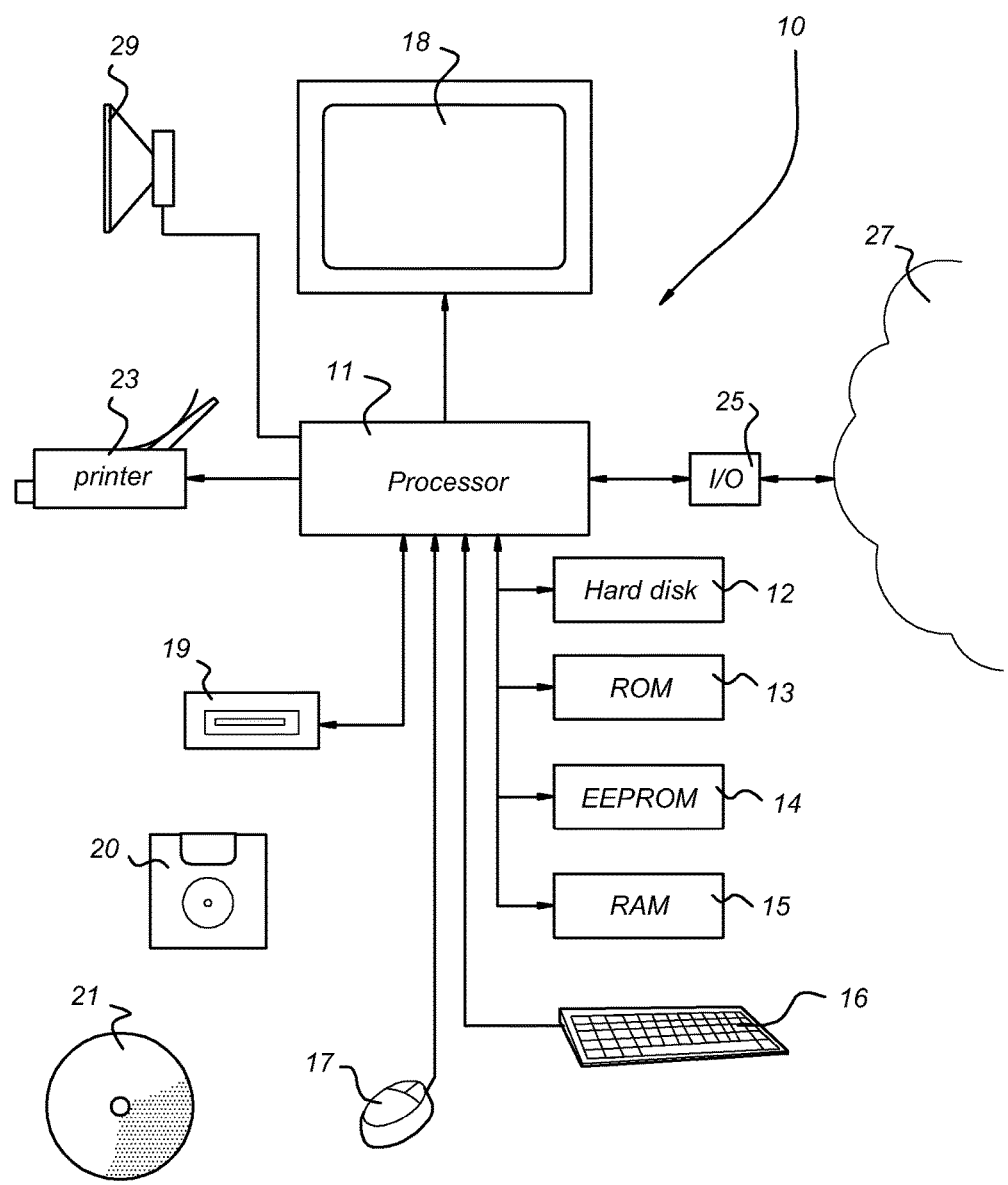
FIG. 4a shows a diagram of a computer arrangement with which the invention can be performed.

In FIG. 4a, an overview is given of a computer arrangement 10 comprising a processor 11 for carrying out arithmetic operations.

The processor 11 is connected to a plurality of memory components, including a hard disk 12, Read Only Memory (ROM) 13, Electrically Erasable Programmable Read Only Memory (EEPROM) 14, and Random Access Memory (RAM) 15. Not all of these memory types need necessarily be provided. Moreover, these memory components need not be located physically close to the processor 11 but may be located remote from the processor 11.

The processor 11 is also connected to means for inputting instructions, data etc. by a user, like a keyboard 16, and a mouse 17. Other input means, such as a touch screen, a track ball and/or a voice converter, known to persons skilled in the art may be provided too.

A reading unit 19 connected to the processor 11 is provided. The reading unit 19 is arranged to read data from and possibly write data on a data carrier like a floppy disk 20 or a CDROM 21. Other data carriers may be tapes, DVD, CD-R. DVD-R, memory sticks etc. as is known to persons skilled in the art.

The processor 11 is also connected to a printer 23 for printing output data on paper, as well as to a display 18, for instance, a monitor or LCD (Liquid Crystal Display) screen, or any other type of display known to persons skilled in the art.

The processor 11 may be connected to a loudspeaker 29.

The processor 11 may be connected to a communication network 27, for instance, the Public Switched Telephone Network (PSTN), a Local Area Network (LAN), a Wide Area Network (WAN), the Internet etc. by means of I/O means 25. The processor 11 may be arranged to communicate with other communication arrangements through the network 27. These connections may not all be connected in real time as the vehicle collects data while moving down the streets.

The data carrier 20, 21 may comprise a computer program product in the form of data and instructions arranged to provide the processor with the capacity to perform a method in accordance with the embodiments. However, such computer program product may, alternatively, be downloaded via the telecommunication network 27.

The processor 11 may be implemented as stand alone system, or as a plurality of parallel operating processors each arranged to carry out subtasks of a larger computer program, or as one or more main processors with several sub-processors. Parts of the functionality of the invention may even be carried out by remote processors communicating with processor 11 through the network 27.

It is observed that when applied in the car 1 the computer arrangement does not need to have all components shown in FIG. 4a. For instance, the computer arrangement does not need to have a loudspeaker and printer then. As for the implementation in the car 1, the computer arrangement needs at least processor 11, some memory to store a suitable program and some kind of interface to receive instructions and data from an operator and to show output data to the operator.

For post-processing the pictures, scans and stored position and orientation data as taken by the camera(s) 9(i), the laser scanner(s) 3(j) and the position/orientation measurement systems, respectively, a similar arrangement as the one shown in FIG. 4a will be used, be it that that one may not be located in the car 1 but may conveniently be located in a building for off-line post-processing. The pictures, scans, and position/orientation data as taken by camera(s) 9(i), scanner(s) 3(*j*) and position/orientation measurement systems are stored in one of the memories 12-15. That can be done via storing them first on a DVD, memory stick or the like, or transmitting them, possibly wirelessly, from the memory 12, 13, 14, 15. All measurements are preferably also time stamped and these various time measurements are stored as well.

Embodiments

According to embodiments the scanner data is used to create a mask for masking off areas in the camera data in order to set differential compression parameters within the camera data. So, the scanner data is used to determine regions in the camera data. The regions may be regions of interest, where different regions of interest may have different levels of interest assigned to them. And different compression parameters may be suitable for different levels of interest.

So, there is provided a method of processing camera data from a mobile mapping system, where the method comprises:

a) obtaining camera data from at least one camera 9(*j*) of the mobile mapping system, b) detecting at least one region in the camera data, c) applying a compression technique on the camera data in a first region, wherein the method further comprises obtaining range sensor data from at least a first range sensor 3(1), the range sensor data at least partially corresponding to the camera data and b) comprises using the range sensor data to identify the at least one region in the camera data.

The method may further comprise d) applying a second compression technique on the camera data in a second region. The at least two regions may be regions of interest, having different levels of interest. The first compression technique may involve applying a first compression factor and the second compression technique may involve applying a second compression factor, the first compression factor being larger than the second compression factor. Of course, this may also be the other way around, i.e. the first compression factor being smaller than the second compression factor.

This allows using a first compression technique for the first region and using a second technique for the second region. The first compression technique may involve using a first compression factor (relatively high data reduction). The second technique may involve using a second compression technique with a second compression factor (relatively low data reduction).

The embodiments use an algorithm to determine regions in the camera data using the scanner data. This algorithm is called a region detection algorithm. Examples of such region detection algorithms will be provided below. The region detection algorithms may be flexible and may be different for different applications, different areas (urban, rural, industrial etc.).

So, b) may comprise applying a region detection algorithm on the range sensor data to detect at least one region. The region detection algorithm may be arranged to detect regions that are 1) within predetermined distance or area criteria,
2) planar,
3) a particular object (or object class),
4) not a particular object (or object class), or
5) surfaces with predetermined characteristics.

An object class may be trees, cars, human beings etc. A surface of a predetermined characteristic may be a planar surface having certain predetermined dimensions or having a predetermined shape (round, triangular, square).

The embodiments use information other than the camera data to detect regions inside the camera data. The camera data and scanner data are correlated by using spatial analysis.

The process of correlating or projecting the scanner data to the camera data may be done as explained here. The scanner data is provided with a time stamp. This time stamp can be used to compute the exact position and orientation of the car 1 at that moment in time. The position and orientation of the car 1 can be deduced from logged data obtained by the GPS (global positioning system) unit, the DMI (Distance Measurement Instrument) and/or the IMU (Inertial Measurement Unit). The laser scanner's position and orientation with reference to the car is known therefore, each laser scanner point can be computed in real world coordinates.

Also, camera data is provided with a time stamp and it's position and orientation with respect to the car is known. Accordingly, for the camera data real world coordinates and orientation can be determined. So, for both the scanner data and the camera data exact position and orientation data are available.

By using information from the camera lens parameters (focal length, calibrated optical distortions), each scanner data can be mapped to the coordinate space of the camera data using simple perspective equation. Therefore each pixel in image data can be associated with depth or with object or surface detected in camera. Since resolution of scanner data is typically lower than image data aggregation of laser scanner data is typically needed. This can be either done by generating a mesh out of the laser scanner points and mapping the mesh to camera data or mapping each laser point to image coordinates and extrapolating in image space using image techniques like dilatation.

So, both the scanner data and the camera data may in fact comprise two types of information: image data and image spatial reference data. The image data forms the image itself (the point cloud or pixels), while the image spatial reference data comprises (meta-) information about defining where and in which direction the image was taken. The image spatial reference data may for instance comprise 6 entries: x, y, z, and α, β, γ, wherein x, y, z coordinates are used to define a (relative) position of the particular camera 9(*j*) or range sensor 3(*i*) and α, β, γ are angles defining a (relative) direction of the particular camera or laser scanner of the particular camera 9(*j*) or range sensor 3(*i*).

Flow Diagram

Figure 4B:
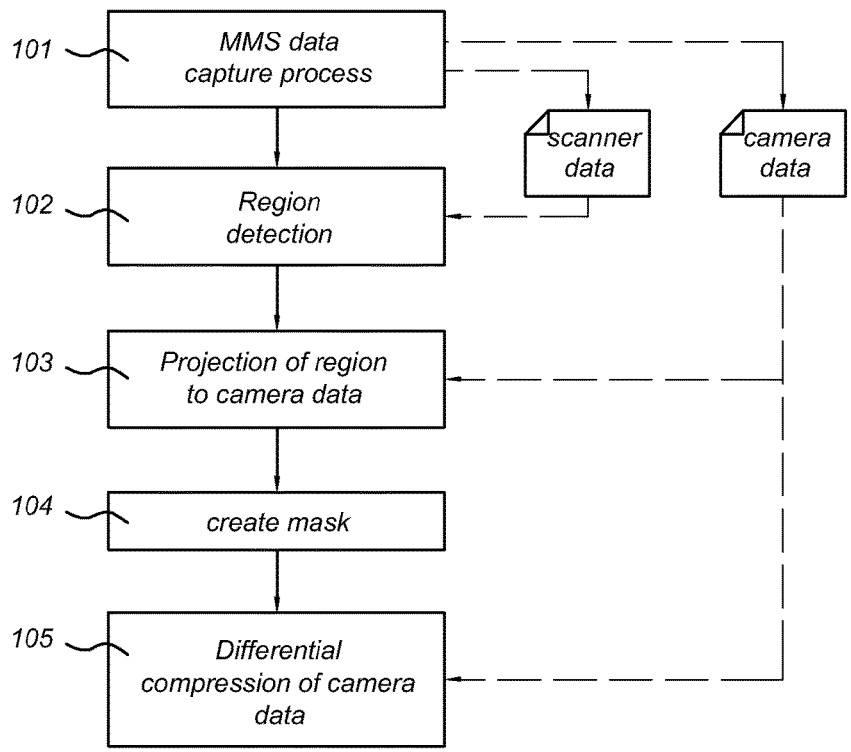
FIG. 4b shows a flow chart in accordance with an embodiment of the invention.

FIG. 4*b* shows a flow diagram according to an embodiment. The flow diagram may be encoded in the form of data and instructions arranged to provide the processor 11 with the capacity to perform the flow diagram. The data and instructions may be stored in memory and may be readable and executable for the processor 11.

In a first action 101 the computer arrangement 10 may capture MMS data as described above. This action results in scanner data and camera data as schematically indicated in FIG. 4*b*.

In a second action 102 the computer arrangement 10 detects regions using the scanner data. Different region detection algorithms may be used for this. The regions may be regions of interest to which a level of interest can be assigned. For instance, some regions may be assigned a first level of interest (e.g. planar objects most likely being traffic signs), while other objects may be assigned a second level of interest being lower than the first level of interest (e.g. regions being more than a predetermined distance away or regions that are associated with a particular object (or object class)).

According to a first region detection algorithm, regions are defined as regions that are within a predetermined distance, such as for instance 10 meters, or area from the car 1. Since the scanner data comprises distance data, all regions in the camera data that are within the predetermined distance from the car 1 can easily be determined. Of course, the predetermined distance may be defined with respect to the car 1, as well as with respect to the cameras 9(I), I=1, 2, 3, . . . I, or the laser scanners 3(j), j=1, 2, 3, . . . J.

Also, regions may be defined as regions that are within a predetermined area with respect to the car, where the area may be a cube shaped area, or any other suitable shaped area, such as for instance a diamond shaped area, a cylinder shaped area, a segment of a sphere etc.

All regions outside the predetermined distance or area may be defined as a first region, while regions inside the predetermined distance or area may be defined as a second region. It is noted here that regions do not necessarily need to be aggregated. As will be explained below, a mask is generated which may be a set of single pixels that is passed to the differential compression.

According to an embodiment, the detected regions may be aggregated and isolated as distinct objects, for instance using aggregation techniques using mesh generation which forms polygons. A technique that may be used is a RANSAC algorithm.

This embodiment will have several advantages. For instance everything that is more than e.g. 10 m away will be better visible on a next picture. So, even if there is some text (or any other information) 60 m away one can ignore it because it will be visible in next images taken by the camera. Therefore, not only a single image is compressed in an efficient way, but also image sequences are compressed in an effective way.

According to a second region detection algorithm, regions are defined as planar objects. A planar object may be defined as a planar object having at least a certain (real world) size, for instance at least 30×30 cm. The real world size of a planar object can be computed from the scanner data using angle and distance data. Planar objects may easily be retrieved from the scanner data, which allows for filtering traffic signs and the like.

According to a third region detection algorithm, the algorithm may be arranged to analyze the scanner data for particular objects, such as cars. If for a particular application there is no interest in cars, the region detection algorithm may be arranged to detect objects shaped as cars and define those objects as a first region, which can be assigned a low level of interest. Inversely, if for a particular application there is special interest for objects like cars, the region detection algorithm may be arranged to detect objects shaped as cars and define those objects as being a region, to which a high level of interest can be assigned.

Also a combination of the above algorithms may be used, in which three regions are identified:
  regions that are planar and within a predetermined area, to which a high level of interest can be assigned,
  regions that are not planar and within a predetermined area, to which a medium level of interest can be assigned, and
  regions that are outside the predetermined area, to which a low level of interest can be assigned.

In general, any appropriate number regions and types of regions may be identified, each may be assigned a specific level of interest and/or may be subject to a suitable compression technique.

In general, two types of region detection algorithms may be identified:
  1) region detection algorithms using distance criteria, and
  2) region detection algorithms using rules to analyze the scanner data searching for specific objects.

The example provided in the FIGS. 5-10 is a combination of these two types of region detection algorithms.

In a further action 103 the regions as detected in action 102 are projected on the camera data.

It is observed that there have been demonstrated ways to link scanner data to camera data. For instance, systems have been demonstrated with cameras that are collocated and synchronized with laser scanners such that they provide a direct correlation between range sensor data and image data. Such systems have been shown, for instance by 3D-CAM—Depth Camera and Depth Keying by Prof. Dr. Dr. h. c. Martin Reiser, Fraunhofer-Institut, Medienkommunikation IMK (http://www.imk.fhg.de/sixcms/media.php/130/3d_cameng.pdf) and
  3D Imaging Camera for Gaming Application, G. Yahav, Member, IEEE, G. J. Iddan and D. Mandelboum, 3DV Systems Ltd., Yokneam, ISRAEL (http://www.3dvsystems.com/technology/3D%20Camera%20for%20Gaming-1.pdf).

Other systems on the market, comprise z-distance augmented cameras images by means of merging images from special infrared cameras with data obtained from normal CCD sensors.

Based on the prior art it is possible to determine a 3D location for each pixel in the camera data. However, it is also possible to just project the scanner data onto the camera data.

In action 104 a mask is created based on actions 102 and 103. The mask may comprise the identified regions and possibly a type indication for each region (planar, object class, within or without predetermined area, etc.) and/or the level of interest assigned to the identified regions. The mask may also comprise a direct indication of the desired compression technique that is to be applied to the specific regions.

The mask may eventually be used to apply the differential compression as described.

Action 103 or 104 may further comprise dilating the scanner data to make sure that all relevant parts of the camera data are taken into account. This dilation is explained in more detail below.

Figure 8A:
FIGS. 8a and 8b show range sensor data projected onto the camera data.

Action 104 is the mask creation in image coordinate space. FIG. 8a shows the result of actions 102/103. Because of the fact that the resolution of the scanner data may be relatively low, projection results in points rather than regions. Dilation as part of action 103/104 therefore is to make sure regions are created rather than points. The mask may comprise information about the different detected regions, where a region in the mask is defined by the area covered by the dilated points of the scanner data. So, the dilated points may be used to form the mask.

Actions 102-104 may be regarded as a single action in which the regions are detected and mapped to the camera data/image space.

As defined above, the scanner data and camera data may comprise two types of information: image data and image spatial reference data. The image data of the scanner data forms the image itself (the point cloud or pixels), while the image spatial reference data comprises (meta-) information about defining where and in which direction the image was taken. It will be understood that action 102 may mainly use the image data of the scanner data, action 103 may use both the image data and image spatial reference data of the camera data. Finally, action 105 may mainly use image data of the camera data.

So, there is provided a method wherein b) further comprises projecting at least one detected region onto the camera data 103. Further provided is a method, wherein b) further comprises creating a mask and performing c) based on the created mask 104. Furthermore, d) may be performed based on the created mask 104.

In a final action 105, the differential compression is applied to the camera data. The differential compression may, as described above, comprise using a first compression technique in a first region. According to an embodiment, a second compression technique may be applied in a second region. The first compression technique may involve using a first compression factor (relatively high). The second technique may involve using a second compression technique involving a second compression factor (relatively low).

The compression technique may be selected based on information comprised in the mask. For instance, when the mask comprises levels of interest for the different regions, the level of interest may be used to select a suitable compression technique. According to an embodiment, a high level of interest corresponds to a low compression factor (possibly a compression factor equal to zero) and a low level of interest corresponds to a high compression factor.

According to an embodiment a translation scale is created between "level of interest" and a quality factor directly, where the quality factor may be a quantitatively scaled compression factor (for example JPEG uses 1 to 100 with 100 being the highest quality).

Also, more than two regions may be detected, where different or the same compression techniques may be applied to the different regions.

It is noted here that a skilled person will understand how to perform action 105, i.e. how to apply differential compression techniques such as differential JPEG compression techniques, once a mask is known. The embodiments provide a way of providing such a mask.

Figure 5:
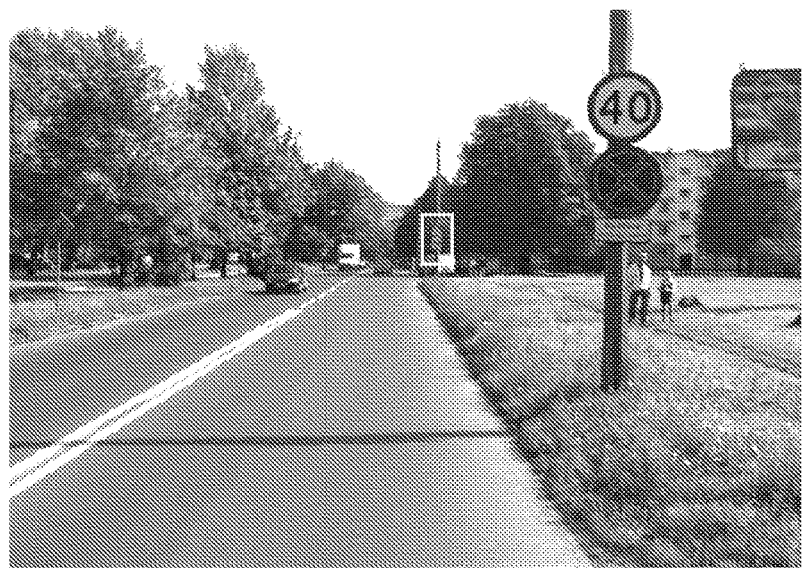
FIG. 5 shows camera data according to an embodiment.

FIG. 5 shows an example of camera data as may result from action 101. A box is depicted in FIG. 5 to indicate an object (traffic sign) that is of no use for interpretation, as it is too far from the camera.

Figure 6:
FIG. 6 shows range sensor data according to an embodiment.

FIG. 6 shows an example of scanner data as may result from action 101. The scanner data may be a 3-D point cloud, where each point has a distance associated with it with respect to for instance the laser scanners $3(j)$, j=1, 2, 3, . . . J.

Above, with reference to action 102 different region detection algorithms were described, resulting in different regions, such as regions defined as 1) regions that are within predetermined distance or area criteria with respect to the car 1, the camera 9 or the scanner 3.

2) planar objects, 3) particular objects or object class, such as cars, 4) not being particular objects or object class, such as cars, or 5) surfaces with predetermined characteristics.

With reference to the figures a combination of 1) and 2) is described. According to this example, everything that is not planar and everything that is outside a certain area with respect to the camera is identified as a first region and planar objects within a certain area with respect to the camera are defined as a second region.

Figure 7:
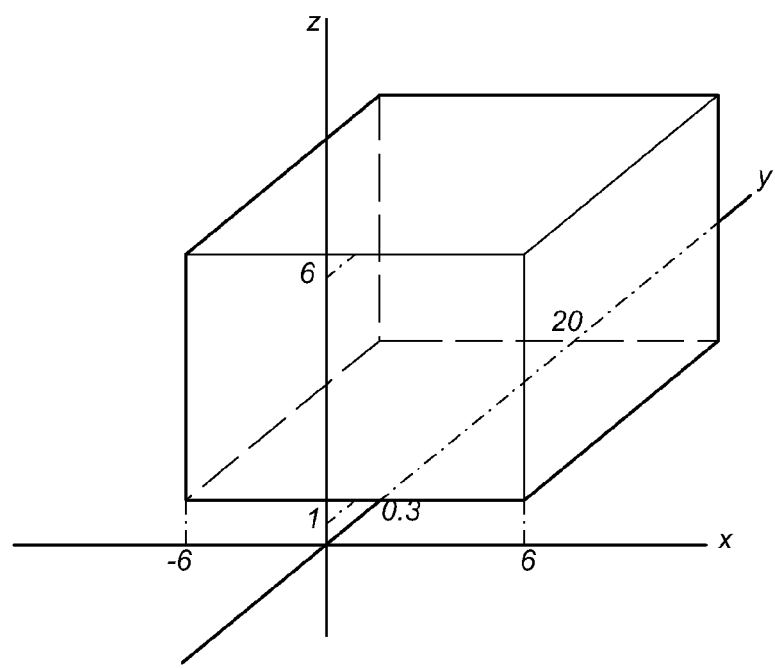
FIG. 7 shows a cubic region according to an embodiment.

First, all scanner data that fall outside a cubicle region as schematically shown in FIG. 7 is regarded a first region. FIG. 7 shows a co-ordinate system where the y direction substantially coincides with the viewing direction of the camera 9. According to the example, the cubicle region is defined as $$x=<-6;\ 6>;\ y=<0.3;\ 20>;\ z=<1;\ 6>.$$

In a next action, all planar objects within the cubicle region are detected and are defined as a second region. Everything that is within the predetermined area and is not planar is defined as a first region. These actions are performed as part of action 102 described above and result in determined regions.

Figure 8B:
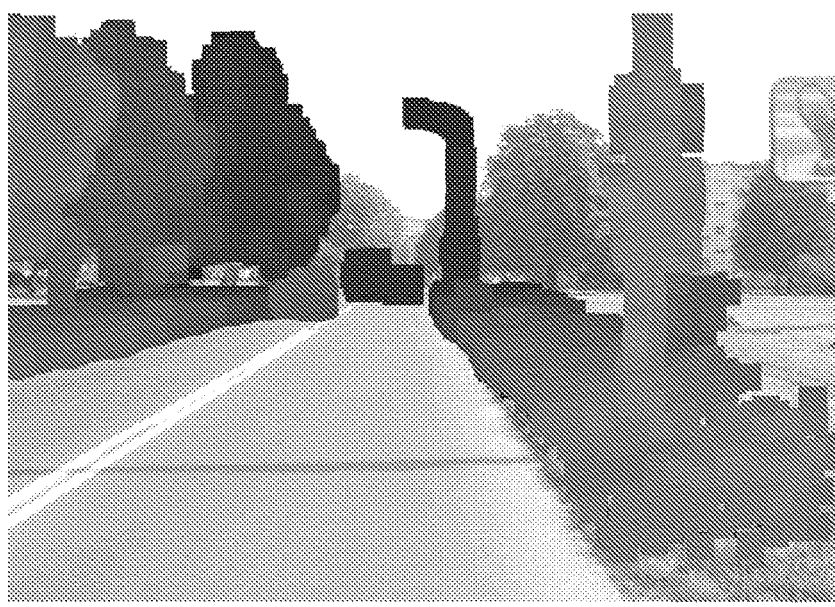

As described above, in action 103 the regions are projected onto the camera data. FIG. 8a schematically depicts the scanner data projected onto the picture data. As the scanner 3 may have a limited resolution, the scanner data may be dilated to make sure that all relevant parts of the camera data are taken into account. The diluted scanner data are shown in FIG. 8b.

Figure 9:
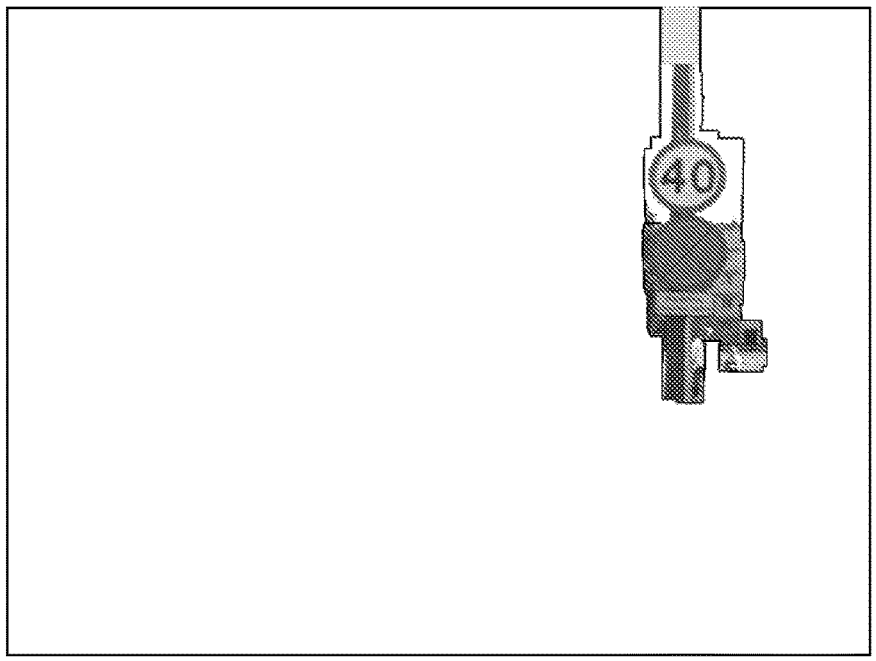
FIG. 9 shows a region of interest in the camera data.

FIG. 9 schematically shows the part of the camera data that is detected to be the second region. This information is used in action 104 to create a mask.

Figure 10:
FIG. 10 shows camera data according to an embodiment.

The mask will enable the use of different compression rate parameters for different regions (action 105). FIG. 10 shows a possible result of action 105. FIG. 10 shows a reconstructed image with different compression rates applied according to the above example.

As can be seen, the traffic sign on the lamppost closest to the camera is still legible. However, the traffic sign further down the road is much more blurry in FIG. 10 than in FIG. 5, and is now impossible to interpret (see box). This is the result of the differential compression technique, which applied a high compression factor to the traffic sign further down the road than to the traffic sign closest to the camera. Since the traffic sign further down the road was barely interpretable (if at all) in FIG. 5 it can be safely compressed.

Compression Techniques

Different compression techniques may be used when performing action 105. For instance, the first and or second compression technique may use the JPEG2000 standard for compressing the camera data. JPEG2000 allows for different compression factors, depending on the quality requirements.

Of course, also other compression techniques may be used, such as any wavelet based compression technique.

According to a further embodiment, the compression technique used on a region is a reduction of color space. This may for instance be employed on a planar region most likely being a traffic sign. Traffic signs are human made structures, so the color space may be reduced to a limited number of colors that are known to be used for making traffic signs (e.g. black, white, blue, red and orange, although the exact set of colors may differ from country to country).

As an example reference is made to VectorMagic software to realize this, as for instance described on http://vectormagic.stanford.edu/vectorize/upload. In general vectorisation of such human made objects is a good compression (data size reduction) technique.

Computer Arrangement

According to the above, further provided is a computer arrangement 10 comprising a processor 11 and memory 12; 13; 14; 15 connected to the processor, the memory comprising a computer program comprising data and instructions arranged to allow said processor 11 to:

a) obtain camera data from at least one camera 9(*j*) of the mobile mapping system 101, b) detect at least one region in the camera data, c) apply a first compression technique on the camera data in a first region, wherein the processor 11 is further allowed to obtain range sensor data 101 from at least a first range sensor 3(1), the range sensor data at least partially corresponding to the camera data and b) comprises using the range sensor data to identify the at least one region in the camera data 102.

According to a further computer arrangement, the processor 11 is further allowed to d) apply a second compression technique on the camera data in a second detected region. The first compression technique may involve applying a first compression factor and the second compression technique may involve applying a second compression factor, the first compression factor being larger than the second compression factor.

Action b) may comprise applying a region detection algorithm on the range sensor data to detect at least one region. The region detection algorithm may be arranged to detect regions that are within predetermined distance or area criteria, planar, a particular object (or object class), not a particular object (or object class), or surfaces with predetermined characteristics.

Furthermore, b) may further comprise projecting the at least one detected region onto the camera data and b) may further comprise creating a mask and performing c) based on the created mask. Also, d) may be performed based on the created mask 104.

Furthermore, b) may comprise detecting a plurality of regions, where the number of regions may vary from one to the number of pixels in the scanner data. Also, the compression technique may be a reduction of color space.

According to a further embodiment, a data processing system is provided comprising a computer arrangement according to the above and a mobile system, said mobile system comprising a position determination system for providing said time and position and orientation data, at least a first range sensor 3(*i*) for providing said first range sensor data and at least one camera 9(*j*) for providing said image data.

According to an embodiment there is provided a computer program product comprising data and instructions that can be loaded by the computer arrangement, allowing said computer arrangement to perform any of the methods according to the above.

According to an embodiment a data carrier is provided with a computer program product according to the above.

Further Embodiments

According to a further embodiment, a plurality of regions may be identified, where the different regions may be subjected to different compression techniques. Each region may be categorized and according to the categorization, a compression technique may be applied. The categorization may for instance be done by assigning levels of interest to the plurality of regions.

According to an embodiment, there is provided a method of processing camera data of a mobile mapping system, where the method comprises:

a) obtaining camera data from at least one camera (9(*j*)) of the mobile mapping system (101), b) detecting at least three regions of interest in the camera data, c1) applying a first compression technique on the camera data in a first region of interest, c2) applying a second compression technique on the camera data in a second region of interest, c3) applying a third compression technique on the camera data in a third region of interest, wherein the method further comprises obtaining range sensor data (action 101) from at least a first range sensor 3(1), the range sensor data at least partially corresponding to the camera data and b) comprises using the range sensor data to identify the regions of interest in the camera data (action 102).

Of course, instead of three, any suitable number of regions may be detected. According to such an embodiment, a method is provided, wherein b) comprises detecting a plurality of regions, where the number of regions may vary from one to the number of pixels in the scanner data.

So, based on the embodiments it is clear that a mask may be created based on the scanner data identifying a plurality of regions to which different compression techniques may be applied. The number of different regions comprised by the mask may be any suitable number, such as two, three, four, etc. In fact, fairly high numbers of regions may be identified and comprised by the mask. Each region may be subject to a different compression technique.

The number of identified regions comprised by the mask may be as high as the number of pixels in the scanner data.

According to an embodiment, each pixel in the scanner data may be detected as a region (action 102). A level of interest may be assigned to each pixel in the scanner data based on the direction information and the distance information. So, as an example, the level of interest may decrease with increasing distance.

According to a further example, all pixels of the laser scanner that are within predetermined distance or area criteria, are given a first level of interest, where all pixels of the laser scanner data outside the predetermined distance or area criteria may be given a level of interest that is decreasing with increasing distance (e.g. inversely proportional with the distance).

Based on the assigned levels of interest, a mask may be created, based on which different compression techniques may be applied to the camera data.

It is assumed that each pixel of the scanner data relates to at least a number of camera pixels on which the suitable compression technique can be applied.

Further Remarks

The embodiments may be employed in the field of MMS applications, as well as in the field of stationary mapping technology, photogrammetry and image and video compression for general scientific and entertainment purposes.

Selection of a region of interest from the scanning data and linking the scanner data to corresponding areas within the camera data does not does not require expensive computations, and is fast enough to handle MMS stream with fair investment in CPU power.

The embodiments provided are reliable and set differential compression masks without losing key data. The embodiments are flexible to use generalized distance and location characteristics or surface characteristics to set the compression masks.

Depending on the application the embodiments may be used more or less conservatively. For a typical Mobile Mapping collection of street signs, a somewhat conservative process can be applied as an immediate post process to camera data resulting in a savings of approximately 3:1.

For specific analysis within a project or for delivery to an end user, a more aggressive approach can be taken using the same technology framework. For example, a process may be interested primary with object within 10 meters of the camera(s) $9(i)$. In this case, a higher compression rate can be achieved for delivery to the processing application (for some applications differential compression could be combined with resolution reduction) to create extremely compact datasets (relative to raw image data).

The invention claimed is:

1. Method of processing camera data of a mobile mapping system, the method comprising:
   obtaining camera data from at least one camera of the mobile mapping system when traveling along a road;
   obtaining range sensor data from at least a first range sensor, the range sensor data at least partially corresponding to the camera data;
   detecting at least two regions in the camera data, the detecting comprising detecting, within a predetermined area, regions having a first specified shape and regions having a second specified shape;
   assigning a level of interest to each of the at least two regions, the assigning comprising assigning the regions having the first specified shape a first level of interest, assigning the regions having the second specified shape a second level of interest, and assigning regions outside the predetermined area a third level of interest; and
   applying a compression technique on the camera data in the at least two regions based on the assigned level of interest for each region, wherein applying the compression technique comprises reducing the color space of one of the at least two regions to a constrained color space, the constrained color space including only colors that are used on human-made objects of the corresponding specified shape.

2. Method according to claim 1, wherein the detecting includes applying a region detection algorithm on the range sensor data to detect the at least two regions.

3. Method according to claim 2, wherein the region detection algorithm is arranged to detect regions that are at least one of
   within distance or area criteria,
   planar,
   surfaces with certain characteristics,
   a particular object or object class, and
   not a particular object or object class.

4. Method according to claim 2, wherein the detecting further includes projecting the at least two regions onto the camera data.

5. Method according to claim 1, wherein the detecting further includes creating a mask and performing the applying of the compression technique based on the created mask.

6. Computer arrangement, comprising:
   a processor and a memory connected to the processor, the memory comprising a computer program comprising data and instructions arranged to cause said processor to:
   obtain camera data from at least one camera of a mobile system when traveling along a road;
   obtain range sensor data from at least a first range sensor, the range sensor data at least partially corresponding to the camera data;
   detect at least two regions in the camera data, the detecting comprising detecting, within a predetermined area, regions having a first specified shape and regions having a second specified shape;
   assign a level of interest to each of the at least two regions, the assigning comprising assigning the regions having the first specified shape a first level of interest, assigning the regions having the second specified shape a second level of interest, and assigning regions outside the predetermined area a third level of interest; and
   apply a compression technique on the camera data in the at least two regions based on the assigned level of interest for each region, wherein applying the compression technique comprises reducing the color space of one of the at least two regions to a constrained color space, the constrained color space including only colors that are used on human-made objects of the corresponding specified shape.

7. Computer arrangement according to claim 6, wherein the computer arrangement detects the at least two regions in the camera data by applying a region detection algorithm on the range sensor data.

8. Computer arrangement according to claim 7, wherein the region detection algorithm is arranged to detect regions that are at least one of
   within a distance or area criteria,
   planar,
   surfaces with certain characteristics,
   a particular object or object class, and
   not a particular object or object class.

9. Computer arrangement according to claim 6, wherein the computer arrangement detects the at least two regions in the camera data by projecting the at least two regions onto the camera data.

10. Computer arrangement according to claim 6, wherein the computer arrangement creates a mask and applies the compression technique based on the created mask.

11. Data processing system, comprising:
    a computer arrangement according to claim 6; and
    a mobile system, the mobile system comprising a position determination system for providing time and position and orientation data, at least a first range sensor to provide said first range sensor data and at least one camera to provide said image data.

12. Method according to claim 3, wherein the detecting further includes projecting the at least two regions onto the camera data.

13. Computer arrangement according to claim 7, wherein the detecting further includes projecting the at least two regions onto the camera data.

14. A non-transitory computer readable medium including program arrangements for, when executed on a computer device, causing the computer device to implement the method of claim 1.

15. The method of claim 1, wherein the detecting further comprises creating a mask formed from a dilation operation performed on the range sensor data.

16. The method of claim 3, wherein the particular object is one of a building façade and a traffic sign.

17. The method of claim 1, wherein applying the compression technique comprises applying different level of compression to each of the at least two regions to create a compressed image from the camera data.

* * * * *